US006099625A

United States Patent [19]

Bradbury et al.

[11] Patent Number: 6,099,625

[45] Date of Patent: Aug. 8, 2000

[54] INK COMPOSITION

[75] Inventors: Roy Bradbury, St Helens; Alan Butters, Ipswich; Clive Moscrop, Heywood; Andrew Slark, Northallerton, all of United Kingdom

[73] Assignee: Zeneca Limited, London, United Kingdom

[21] Appl. No.: 08/945,649

[22] PCT Filed: Apr. 26, 1996

[86] PCT No.: PCT/GB96/00994

§ 371 Date: Jan. 8, 1998

§ 102(e) Date: Jan. 8, 1998

[87] PCT Pub. No.: WO96/34916

PCT Pub. Date: Nov. 7, 1996

[30] Foreign Application Priority Data

May 1, 1995 [GB] United Kingdom ................... 9508810

[51] Int. Cl.[7] ..................................................... C09D 11/02

[52] U.S. Cl. .................................... 106/31.27; 106/31.43; 106/31.44; 106/31.45; 106/31.47; 106/31.5; 106/31.48; 106/31.51; 106/31.6; 106/31.75; 106/31.77; 106/31.78; 106/31.8

[58] Field of Search ............................. 106/31.27, 31.43, 106/31.44, 31.45, 31.47, 31.5, 31.48, 31.51, 31.6, 31.75, 31.77, 31.78, 31.8

[56] References Cited

U.S. PATENT DOCUMENTS

| | | | |
|---|---|---|---|
| 3,889,271 | 6/1975 | Freytag et al. | 106/31.51 |
| 4,105,572 | 8/1978 | Gorondy | 427/127 |
| 4,732,615 | 3/1988 | Kawashita et al. | 106/31.49 |
| 4,954,410 | 9/1990 | Takuma et al. | 430/109 |
| 4,969,951 | 11/1990 | Koike et al. | 106/31.43 |
| 5,233,028 | 8/1993 | Ohtsuka et al. | 534/758 |
| 5,296,325 | 3/1994 | Ohtsuka et al. | 430/109 |

FOREIGN PATENT DOCUMENTS

| | | |
|---|---|---|
| 087 037 | 8/1983 | European Pat. Off. . |
| 100 008 | 2/1984 | European Pat. Off. . |
| 196 901 | 10/1986 | European Pat. Off. . |
| 202 656 | 11/1986 | European Pat. Off. . |
| 330 487 | 8/1989 | European Pat. Off. . |
| 441 255 | 8/1991 | European Pat. Off. . |
| 2 208 791 | 6/1974 | France . |
| 2 346 747 | 10/1977 | France . |
| 25 07 907 | 9/1976 | Germany . |
| 42 17 973 | 12/1993 | Germany . |
| 224 363 | 11/1924 | United Kingdom . |

*Primary Examiner*—Helene Klemanski
*Attorney, Agent, or Firm*—Pillsbury Madison & Sutro LLP

[57] ABSTRACT

Compounds and ink compositions. An ink composition comprising a compound of Formula (1) and salts thereof:

Formula (1)

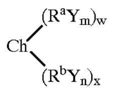

wherein

Ch represents an arrangement of atoms which causes the compound to absorb electromagnetic radiation;

$R^a$ and $R^b$ each independently is a spacer group;

Y is an interactive functional group;

w and x each independently is 0 or an integer equal to or greater than 1; and m and n each independently is an integer equal to or greater than 1, provided that w and x are not both equal to zero and when one of w or x is 0 at least one of m and n is equal to or greater than 2. For use in ink jet printing and electrophotography.

10 Claims, No Drawings

INK COMPOSITION

The present invention relates to compounds, compositions and solutions thereof, suitable for use in printing and imaging technologies, especially those suitable for coloration of substrates such as paper, plastics, textiles, metal and glass by printing processes such as inkjet printing and those suitable for use in electrophotography such as charge control agents (CCA), charge transfer materials (CTM), charge generating materials (CGM) and toners.

Inkjet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good waterfastness, light fastness and optical density, have fast fixation to the substrate and cause no clogging of the nozzle.

Electrophotographic copiers or printers generally comprise an organic photoconductor (OPC) and a developer or toner. The OPC generally comprises an electrically conducting support, a charge generating layer and a charge transport layer. The electrically conducting support is a metal drum, typically an aluminium drum, or a metallised polymer film, typically aluminised polyester. The charge generating layer comprises a charge generating material (CGM) and a binder resin, typically a polycarbonate. The charge transport later comprises a charge transport material (CTM) and a binder resin, typically a polycarbonate. The developer or toner comprises a toner resin, a colorant and optionally a charge control agent (CCA). The toner resin is typically a styrene or substituted styrene polymer or styrene-butadiene copolymer. The colorant is typically a dye or pigment or mixture thereof.

According to the present invention there is provided an ink composition comprising a compound of Formula (1) and salts thereof:

Formula (1)

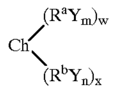

wherein

- Ch represents an arrangement of atoms which causes the compound to absorb electromagnetic radiation;
- $R^a$ and $R^b$ each independently is a spacer group;
- Y is an interactive functional group;
- w and x each independently is 0 or an integer equal to or greater than 1; and
- m and n each independently is an integer equal to or greater than 1, provided that w and x are not both equal to zero and when one of w or x is 0 at least one of m and n is equal to or greater than 2.

The compound may absorb radiation in the UV, visible or infra-red region of the electromagnetic spectrum.

The chromogen represented by Ch is preferably an optionally substituted group of Formula (2):

Formula (2)

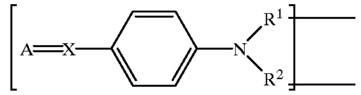

in which $R^1$ and $R^2$ each independently is —H, or optionally substituted alkyl or alkoxy; or an optionally substituted group of Formula (2B):

Formula (2B)

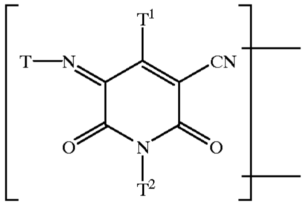

and tautomers thereof in which T is $A^1$-NH or optionally substituted phenyl (such as optionally substituted mono- or dialkylaminophenyl), $T^1$ is optionally substituted $C_{1-12}$-allyl or optionally substituted aryl, and $T^2$ is optionally substituted alkyl; or an optionally substituted group of Formula (3):

Formula (3)

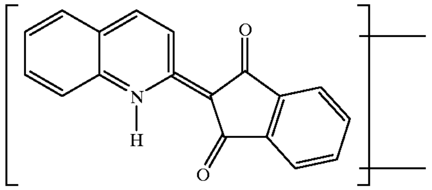

or an optionally substituted group of Formula (4):

Formula (4)

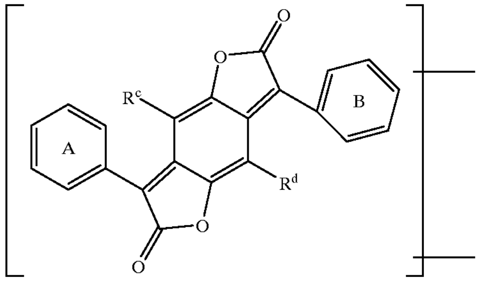

in which $R^c$ and $R^d$ each independently is H, alkyl, alkoxy or halogen and Ring A and Ring B may carry from 1 to 5 optional substituents; or an optionally substituted group of Formula (5):

Formula (5)

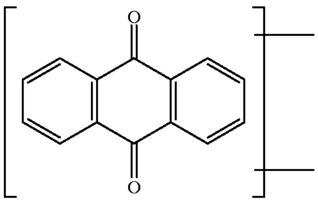

except for 1,4-bis(4-aminobutyl)-9,10-anthracenedione, 1,4-bis(3-aminopropyl)-9,10-anthracenedione and 1,8-bis[(2-chloroethyl)thio]anthraquinone in which X is —C(R) or N and R is H, CN or COOalkyl; and A is $A^1$-N in which $A^1$ is the residue of a diazotisable aromatic or heteroaromatic amine or is selected from an optionally substituted group of Formula (6):

Formula (6)

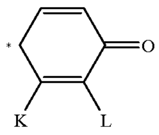

in which K and L each independently is any of the optional substituents listed below or K and L together with the carbon atoms to which they are attached form a 5- or 6-membered carbocyclic or hetrocyclic ring; or an optionally substituted group of Formula (7):

Formula (7)

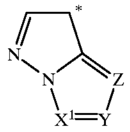

wherein $X^1$, Y and Z each independently is N or C-$R^3$ in which $R^3$ is —H, —CN alkyl, alkoxy, cycloallyl, aryl, aralkyl, aryloxy or amino; or an optionally substituted group of Formula (8):

Formula (8)

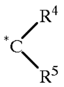

wherein $R^4$ and $R^5$ each independently is an electron withdrawing group or $R^4$ and $R^5$ may be joined form a heterocyclic ring such as;

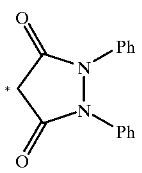

or an optionally substituted group of Formula (9):

Formula (9)

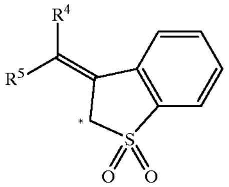

wherein $R^4$ and $R^5$ are as hereinbefore defined; or an optionally substituted group of Formula (10):

Formula (10)

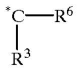

wherein $R^3$ is as hereinbefore defined and $R^6$ is alkenyl or

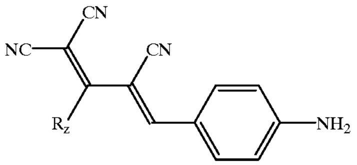

wherein $R_z$ is $NH_2$, phenyl or succinamido;

or an optionally substituted group of Formula (11):

Formula (11)

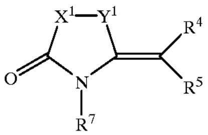

in which $X^1$ and $Y^1$ are both C and $R^4$ and $R^5$ are as hereinbefore defined and $R^7$ is —H, alkyl or aryl, where * shows the point of attachment to the double bond in Formula (2).

$R^4$ and $R^5$ each independently is preferably —CN, —$NO_2$, —COOH or —$COOC_{1-6}$-alkyl.

$A^1$ is preferably selected from phenyl, naphthyl, thiazolyl, isothiazolyl, benzothiazolyl, benzoisothiazolyl, pyrazolyl, thiadiazolyl, imidazolyl, thienyl, pyridyl and pyridoisothiazolyl each of which may be optionally substituted.

Where $A^1$ is phenyl it is preferably of the Formula (12):

Formula (12)

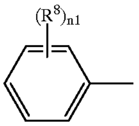

wherein:

$R^8$ is —H, optionally substituted alkyl, optionally substituted alkoxy, —$NO_2$, —CN, —$CF_3$, —SCN, halogen, alkoxyallyl, —COalkyl, —OCOalkyl, —COOalkyl, —$SO_2NH_2$, —$SO_2F$, —$SO_2Cl$, —$CONH_2$, —COF, —COCl, —$SO_2$alkyl, —CONH(alkyl), —CON(allyl)$_2$, —$SO_2N$(alkyl)$_2$, —Salkyl, —Sphenyl; and $n^1$ is an integer from 1 to 5.

Where $A^1$ is naphthyl it is preferably a naphth-1-yl of the Formula (13):

Formula (13)

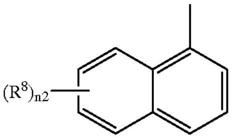

wherein:

$R^8$ is as hereinbefore defined; and $n^2$ is an integer from 1 to 4.

Where $A^1$ is thiazolyl it is preferably a thiazol-2-yl of the Formula (14):

Formula (14)

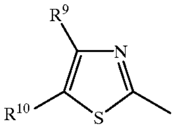

wherein:

$R^9$ is —H or optionally substituted alkyl, optionally substituted alkoxy, optionally substituted aryl, halogen or —Salkyl; and $R^{10}$ is —H, optionally substituted alkyl, alkenyl, —CN, —$NO_2$, —$SO_2$alkyl, —COOalkyl, halogen or —CHO.

Where $A^1$ is isothiazolyl it is preferably an isothiazol-5-yl of the Formula (15):

Formula (15)

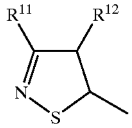

wherein:

$R^{11}$ is —H, optionally substituted alky, optionally substituted aryl, —$SO_2$alky, —Salkyl, —Saryl or halogen; and $R^{12}$ is —H, —CN, —$NO_2$, —SCN or —COOalkyl.

Where $A^1$ is benzothiazolyl it is preferably a benzothiazol-2-yl of the Formula (16):

Formula (16)

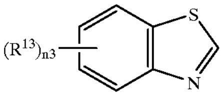

wherein:

$R^{13}$ is —H, —SCN, —$NO_2$, —CN, halogen, optionally substituted alky, optionally substituted alkoxy, —COOalkyl, —OCOalkyl or —$SO_2$alkyl; and $n^3$ is from 1 to 4.

Where $A^1$ is benzoisothiazolyl it is preferably a benzoisothiazol-3yl of the Formula (17):

Formula (17)

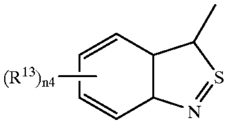

wherein:

$R^{13}$ is as hereinbefore defined; and $n^4$ is from 1 to 4.

Where $A^1$ is pyrazolyl it is preferably a pyrazol-5-yl of the Formula (18):

Formula (18)

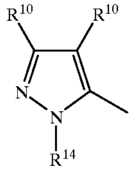

wherein:

each $R^{10}$ is independenty as hereinbefore defined; and $R^{14}$ is —H, optionally substituted alkyl or optionally substituted aryl.

Where $A^1$ is thiadiazolyl it is preferably a 1,2,4-thiadiazol-5-yl of Formula (19):

Formula (19)

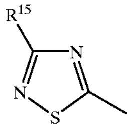

wherein:

$R^{15}$ is —Salkyl, —Saryl, —$SO_2$alkyl or halogen or is a 1,3,4-thiadiazol-5-yl of Formula (20):

Formula (20)

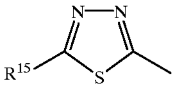

wherein:

$R_{15}$ is as hereinbefore defined.

Where $A^1$ is imidazolyl it is preferably an imidazol-2-yl of the Formula (21):

Formula (21)

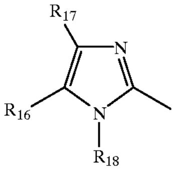

wherein:

$R^{16}$ is —ON, —CHO, —CH=C(CN)$_2$ or —CH=C(CN)(COOallyl);

$R_{17}$ is —CN or —Cl; and $R_{18}$ is —H or optionally substituted alkyl.

Where $A^1$ is thienyl it is preferably a thien-2-yl of the Formula (22):

Formula (22)

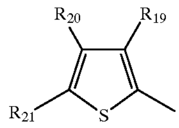

wherein:

$R^{19}$ is —$NO_2$, —ON, alkylcarbonylarnino or alkoxycarbonyl;

$R_{20}$ is —H, halogen, optionally substituted alkyl, optionally substituted alkoxy, optionally substituted aryl or —Saldkyl; and $R_{21}$ is —H, optionally substituted alkyl, —CN, —$NO_2$, —$SO_2$alkyl, —COOalkyl, halogen, —CH═C(CN)$_2$ or —CH═C(CN)(COOalkyl).

Where $A^1$ is pyridyl it is preferably a pyrid-2-yl, pyrid-3-yl or pyrid-4-yl of the Formula (23):

Formula (23)

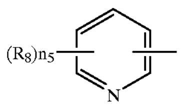

wherein:

$R_8$ is as hereinbefore defined; and $n_5$ is from 1 to 4.

Where $A^1$ is pyridoisothiazolyl it is preferably a pyridoisothiazol-3-yl of the Formnula (24):

Formula (24)

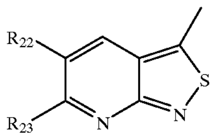

wherein:

$R_{22}$ is —ON or —$NO_2$; and $R_{23}$ is optionally substituted alkyl.

The spacer group provides some degree of insulation and limits the impact of the interactive functional group on the absorption characteristics of Ch. The spacer group is an atom or group of atoms which links the spacer group to Ch by at least one σ (sigma) bond and links the spacer group to Y by at least one a (sigma) bond. The spacer group preferably comprises at least one atom selected from C, Si and S more preferably C or Si and especially C. Where the spacer group is S it is preferably a divalent sulphide.

At least one of the spacer groups represented by $R^a$ and $R^b$ preferably comprises at least one and more preferably at least two carbon atoms.

In the compounds of Formulae (1) to (5) it is preferred that at least one of $R^a$ and $R^b$ comprises two or more, more preferably three or more carbon atoms. It is further preferred that both $R^a$ and $R^b$ comprise two or more, more preferably three or more carbon atoms. It is especially preferred that $R^a$ and $R^b$ independently is $C_{2-10}$-alkylene and more especially $C_{3-10}$-alkylene. A preferred subgroup of compounds of Formulae (1) to (5) is that in which $R^a$ and $R^b$ each independently is $C_{2-5}$-alkylene especially compounds in which $R^a$ and $R^b$ is $C_{2-5}$-alkylene substituted only by a Y group.

The interactive functional group represented by Y are such that the Y groups on different molecules may interact with each other to form complexes of larger size and thus of lower mobility and/or the Y groups may interact the substrate. In the compounds of Formulae (1) to (5) the Y groups may be the same or different and the $R^a$ and $R^b$ may carry one or more Y groups. The interactions between different Y groups or between the Y groups and the substrate produces a print or an image on the substrate which is resistant to water and light and which fixes rapidly. The Y groups are preferably selected from OH, $NH_2$, $NHR^{24}$, COOH, $CONH_2$. $CONHR^{24}$, $SO_2NH_2$, $SO_2NHR^{24}$, $NHCONH_2$, $NHCONHR^{24}$, ═NOH, $OR^{24}$, CN, —NHC(═NH)$NH_2$, —SC(═NH)$NH_2$, $NO_2$, mono chloro-S-triazinyl and halogen in which $R^{24}$ is alkyl, aryl or aralkyl, more preferably from the groups having at least one H atom and especially from $NH_2$, $NHR^{24}$, COOH, $CONH_2$, $CONHR^4$, $SO_2NH_2$, $SO_2NHR^4$, $NHCONH_2$, $NHCONHR^{24}$ and ═NOH.

A preferred subgroup of compound is that in which Ch is a group of Formula (2).

A further preferred subgroup of compounds is that in which Ch contains a substituted group comprising an a-branched N-alkyl group.

A further preferred subgroup of compounds is that in which Ch is a group of Formula (2) and contains a substituted group comprising an α-branched N-alkyl group.

It is preferred that the present compounds have a molecular weight in the range 150 to 600.

Where any of the above groups are optionally substituted the optional substituents are preferably selected from —CN, —$NO_2$, —Cl, —F, —Br, $C_{1-6}$-alkyl, $C_{1-6}$-alkoxy, —$NHCOCO_{1-6}$-alkyl, NHCOphenyl, —$NHSO_2$phenyl and phenoxy.

Certain of the compounds of Formula (1) are novel and accordingly form a further feature of the present invention.

Particularly preferred compounds of Formula (1) are those in which Ch is an optionally substituted group of Formula (2) or Formula (2b) or Formula (3) or Formula (4) or Formula (5).

Especially preferred compounds of Formula (1) are those in which Ch is a optionally substituted group of Formula (2) in which X is —C(R) and A and R are as hereinbefore defined.

In compounds of Formula (3) a preferred group of compounds are those in which at least one of $R^a$ and $R^b$ is $C_{2-10}$-alkylene, more preferably those in which both $R^a$ and $R^b$ are $C_{2-10}$-alkylene. In compounds of Formula (5) it is preferred that one of $R^a$ and $R^b$ is $C_{2-10}$ -alkylene and that the optional substituents are selected from —CN, —$NO_2$, —Cl, —F, —Br, $C_{1-6}$-alkyl and $C_{1\ 6}$-alkoxy.

In compounds of Formula (2) where X is N and A is $A^1$—N—it is preferred that the spacer groups represented by $R^a$ and $R^b$ contain S or Si or more than two C atoms in an alkylene chain, it is further preferred in such compounds that Y is selected from $NH_2$, $NHR^4$, COOH, $CONH_2$, $CONHR^{24}$, $SO_2NH_2$, $SO_2NHR^{24}$, $NHCONH_2$, $NHCONHR^{24}$, ═NOH, $OR^{24}$, CN, $NO_2$ and monochloro-S-triazinyl and that optional substituents are selected from —CN, —$NO_2$, —Cl, —F, —Br, $C_{1-6}$-alkyl and $C_{1-6}$-alkoxy.

The compounds of the invention may be prepared by conventional methods such as those described in EP285665, EP400706, EP483791.

The substrate used in the inkjet printing process may be paper, plastics, textile, metal or glass and is preferably paper, plastic or a textile material, especially a natural, semi-synthetic or synthetic material.

Examples of natural textile materials include wool, silk, hair and cellulosic materials, particularly cotton, jute, hemp, flax and linen.

Examples of synthetic and semi-synthetic materials include polyamides, polyesters, polyacrylonitriles and polyurethanes.

The medium for the present ink compositions may be a liquid or a low melting point solid. Liquid media may be aqueous or solvent-based. Aqueous-based ink compositions are generally used in office or home printers whereas solvent based ink compositions find use in industrial continuous printers.

It is preferred that the compound of Formula (1) is dissolved completely in the aqueous or solvent medium to form a solution.

The ink compositions of the present invention preferably contain from 0.5% to 20%, more preferably from 0.5% to 15%, and especially from 1% to 3%, by weight of the compound of Formula (1) based on the total weight of the ink. Although many ink compositions contain less than 5% by weight of colorant, it is desirable that the compound has a solubility of around 10% or more to allow the preparation of concentrates which may be used to prepare more dilute inks and to minimise the chance of precipitation of the compound if evaporation of the liquid medium occurs during use of the ink.

Where the liquid medium is aqueous based it is preferably water or a mixture of water and one or more water-soluble organic solvent. The weight ratio of water to organic solvent (s) is preferably from 99:1 to 1:99, more preferably from 99:1 to 50:50 and especially from 95:5 to 80:20. The water-soluble organic solvent(s) is preferably selected from $C_{1-4}$-alkanols such as methanol, ethanol, n-propanol, isopropanol, n-butanol, sec-butanol, tert-butanol or isobutanol; amides such as dimethylformamide or dimethylacetamide; ketones or ketone-alcohols such as acetone or diacetone alcohol; ethers such as tetrahydrofuran or dioxane; oligo- or poly-alkyleneglycols such as diethylene glycol, triethylene glycol, polyethylene glycol or polypropylene glycol; alkyleneglycols or thioglycols containing a $C_2$–$C_6$-alkylene group such as ethylene glycol, propylene glycol, butylene glycol, pentylene glycol or hexylene glycol and thiodiglycol; polyols such as glycerol or 1,2,6-hexanetriol; $C_{1-4}$-alkyl-ethers of polyhydric alcohols such as 2-methoxyethanol, 2-(2-methoxyethoxy)ethanol, 2-(2-ethoxyethoxy)-ethanol, 2-[2-(2-methoxyethoxy)ethoxy] ethanol, 2-[2-(2-ethoxyethoxy)-ethoxy]-ethanol; heterocyclic ketones, such as 2-pyrrolidone and N-methyl-2-pyrrolidone; or mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methyl-pyrrolidone; alkylene- and oligo-alkylene-glycols, such as ethyleneglycol, diethyleneglycol, triethyleneglycol; and lower alkyl ethers of polyhydric alcohols such as or 2-methoxy-2-ethoxy-2-ethoxyethanol; and polyethyleneglycols with a molecular weight of up to 500. A preferred specific solvent mixture is a binary or ternary mixture of water and diethylene glycol and/or, 2-pyrrolidone or N-methylpyrrolidone in weight ratios 75-95:25-5 and 6080:0-20:0-20 respectively.

Examples of suitable ink media are given in U.S. Pat. No. 4,963,189, U.S. Pat. No. 4,703,113, U.S. Pat. No. 4,626,284 and EP 4,251,50A.

According to a further aspect of the present invention there is provided a process for printing a substrate with an ink composition using an ink jet printer, characterised in that the ink composition comprises at least one compound of Formula (1).

A suitable process for the application of an ink composition as hereinbefore described comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

Preferred substrates include overhead projector slides or papers, including plain and treated papers, which may have an acid, alkaline or neutral character or textile materials such as cotton.

The preferred ink compositions used in the process is as hereinbefore described.

According to a further aspect of the present invention there is provided a paper or an overhead projector slide or textile material printed with an ink composition comprising a compound of Formula (1).

Where the liquid-medium is solvent based the solvent is preferably selected from ketones, alkanols, aliphatic hydrocarbons, esters, ethers, amides or mixtures thereof.

Where an aliphatic hydrocarbon is used as the solvent a polar solvent such as an alcohol, ester, ether or amide is preferably added. Preferred solvents include ketones, especially methyl ethyl ketone and alkanols especially ethanol and n-propanol.

Solvent based ink compositions are used where fast drying times are required and particularly when printing onto hydrophobic substrates such as plastics, metal or glass.

Where the medium for an ink composition is a low melting point solid the melting point of the solid is preferably in the range from 60° C. to 125° C. Suitable low melting point solids include long chain fatty acids or alcohols, preferably those with $C_{1-24}$ chains, or sulphonamides. The compound of Formula (1) may be dissolved in the low melting point solid or may be finely dispersed in it.

According to a further aspect of the present invention there is provided a process for the coloration of a textile material with any of the abovementioned ink compositions comprising a compound of Formula (1) which comprises the steps:

i) applying to the textile material by inkjet printing the ink composition; and ii) heating the textile material at a temperature from 50° C. to 250° C. to fix the compound on the material.

The process for coloration of a textile material by inkjet printing preferably comprises a pretreatment of the textile material with an aqueous pretreatment composition comprising a water-soluble base, a hydrotropic agent and a thickening agent followed by removing water from the pre-treated textile material to give a dry pre-treated textile material which is subjected to inkjet printing in step i) above.

The pretreatment composition preferably comprises a solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide. The amount of base may be varied within wide limits provided sufficient base is retained on the textile material after pretreatment to promote the formation of a covalent bond between the compound and the pretreated textile material. Where the base is sodium bicarbonate it is convenient to use a concentration of from 1% to 5% by weight based on the total weight of the composition.

The hydrotropic agent is present to provide sufficient water to promote the fixation reaction between the compound and the textile material during the heat treatment, in step (d) above, and any suitable hydrotropic agent may be employed. Preferred hydrotropic agents are urea, thiourea and dicyandiamide. The amount of hydrotropic agent depends to some extent on the type of heat treatment If steam is used for the heat treatment generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive dyes. Suitable thickening agents include alginates, especially sodium alginate, xantham gums, monogalactam thickeners and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener this range can be provided by using from 10% to 20% by weight based on the total weight of the pretreatment composition.

The remainder of the pretreatment composition is preferably water, but other ingredients may be added to aid fixation of the compound to the textile material or to enhance the clarity of print by inhibiting the diffusion (migration) of compound from coloured areas to non-coloured areas before fixation.

Examples of fixation enhancing agents are cationic polymers, such as a 50% aqueous solution of a dicyanamide/phenol formaldehyde/ammonium chloride condensate e.g. MATEXIL FC-PN (available from ICI), which have a strong affinity for the textile material and the compound, even a compound which has been rendered unreactive by hydrolysis of the reactive group, and thus increase the fixation of the compound on the textile material.

Examples of anti-migration agents are low molecular weight acrylic resins, e.g. polyacrylates, such as poly(acrylic acid) and poly(vinyl acrylate).

Where the compound of Formula (1) contains a monochloro-S-triazinyl reactive group, it has been found that the yield of compound fixed to the textile material can be improved by the addition to the pretreatment composition of certain tertiary amines which are capable of interacting with the reactive group so as to replace the chloro atom and form a quaternary nitrogen leaving group, corresponding to the tertiary amine, which is displaced during fixation reaction of the compound with the textile material. It is therefore a preferred feature of the present process that the pretreatment composition also contains such a tertiary amine. Any tertiary amine may be used, but a preferred tertiary amines are substantially odourless compounds such as 1,4-diazabicyclo[2.2.2]octane (DABCO) and substituted pyridines, preferably carboxypyridines, and especially those in which the pyridine ring is substituted by a carboxylic acid group in the 3 or 4 position, such as nicotinic or isonicotinic acid.

However, when further agents are added to the pretreatment composition, care must be taken to balance their effects and to avoid interactions with the other ingredients of the composition.

In the pretreatment stage of the present process the pretreatment composition is preferably evenly applied to the textile material. Where a deeply penetrated print or a deep shade is required the pretreatment composition is preferably applied by a padding or similar process so that it is evenly distributed throughout the material. However, where only a superficial print is required the pretreatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink jet printing technique, whether drop on demand (DOD) or continuous flow. The ink composition, preferably also contains a humectant to inhibit evaporation of water and a preservative to inhibit the growth of fungi, bacteria and/or algae in the solution. Where the reactive group is labile even in neutral environment, hydrolysis of the reactive group on the compound in the aqueous composition and during the fixation can be inhibited by use, as humectant, of a glycol or mixture of glycols, in which not more than one hydroxy group is a primary hydroxy group. Examples of suitable humectants are, propan-1,2-diol, butan-1,2-diol, butan-2,3diol and butan-1,3-diol. However, the presence of small amounts, up to about 10%, preferably not more than 5%, in total, of polyols having two or more primary hydroxy and/or primary alcohols is acceptable, although the composition is preferably free from such compounds. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the compound on the textile material as this has been found to minimise the diffusion of the compound from printed to non-printed regions. As with the pretreated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes in order to effect reaction between the compound and the fibre and thereby to fix the compound on the textile material. If a steam (wet) heat treatment is used, the printed material is preferably maintained at 100–105° C. for from 5 to 15 minutes whereas if a dry heat treatment is employed the printed material is preferably maintained at 140–160° C. for from 2 to 8 minutes.

After allowing the textile material to cool, unfixed compound and other ingredients of the pretreatment and ink compositions may be removed from the textile material by a washing sequence, involving a series of hot and cold washes in water and aqueous detergent solutions before the textile material is dried.

According to further aspects of the present invention there are provided textile materials, especially cellulosic textile materials, coloured with any of the ink compositions according to the present invention or by means of the process according to the present invention.

According to a further feature of the present invention there is provided a toner resin composition comprising a toner resin and a compound characterised in that the compound is of Formula (1).

The toner resin is a thermoplastic resin suitable for use in the preparation of toner compositions. A preferred toner resin is a styrene or substituted styrene polymer or copolymer such as polystyrene or styrene-butadiene copolymer, especially a styrene-acrylic copolymer such as a styrene-butyl methacrylate copolymer. Other suitable toner resins include polyesters, polyvinylacetate, polyalkenes, polyvinylchloride, polyurethanes, polyamides, silicones, epoxyresins and phenolic resins. Examples of toner resins are given in Electrophotography by R. M. Scharfert (Focal Press), U.S. Pat. No. 5,143,809, UK 2090008, U.S. Pat. No. 4,206,064 and U.S. Pat. No. 4,407,928.

The toner resin composition preferably contains from 0.1% to 20% of the compund of Formula (1) more preferably from 3% to 10% based on the total weight of the toner resin compositions.

The toner resin composition may be prepared by any method known to the art which typically involves mixing the toner resin with a charge control agent (CCA) and the compound of Formula (1) by kneading in a ball mill above the melting point of the resin. Generally, this involves mixing the molten toner resin composition for several hours at temperatures from 120 to 200° C., in order to uniformly distribute the CCA and compound throughout the toner resin. The toner resin is then cooled, crushed and micronised until the mean diameter of the particles is preferably below 20 μm and, for high resolution electro-reprography, more preferably from 1 to 10 μm. The powdered toner resin composition so obtained may be used directly or may be diluted with an inert solid diluent such as fine silica by mixing for example in a suitable blending machine.

CCA's are more fully described in W094/23344.

The invention is further illustrated by the following Examples, which may be used to prepare ink compositions of the present invention, in which all parts and percentages are by weight unless otherwise stated.

EXAMPLE 1

Preparation of

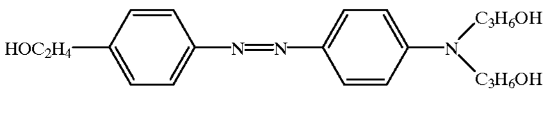

i) Aniline (18.6 g), 3-chloropropan-1-ol (56.7 g) and calcium carbonate (30.0 g) in water (250cm$^3$) were refluxed for 30 hours. The resulting mixture was filtered and the filtrate was separated into an oil and a water layer. The oil was dissolved in dichloromethane and the solvent was removed to leave N,N-di(3-hydroxy-n-propyl)aniline as a brown oil.

ii) 2-(4-aminophenylethanol (10 g) was added portion-wise with stirring to a mixture of concentrated hydrochloric acid (40cm$^3$) in water (240cm$^3$) at 0–5° C. and sodium nitrite (5.1 g) in water (20cm$^3$) was added dropwise. The mixture was stirred for 1 hour and the excess nitrous acid was destroyed by the addition of sulphamic acid. The resulting solution was added with stirring to a solution of N,N-di(3-hydroxy-n-propyl) aniline (15 g) in methanol (300cm$^3$) at 0 to 5° C., stirred for 1 hour, diluted with water (400cm$^3$) and sodium acetate was added to adjust the pH to 4. The resulting solution was extracted with ethyl acetate (4×400cm$^3$) and the combined extracts were dried over magnesium sulphate, filtered and evaporated to leave a red oil which was purified by column chromatography to the leave the title compound m.p 98–100° C.

EXAMPLE 2

Preparation of

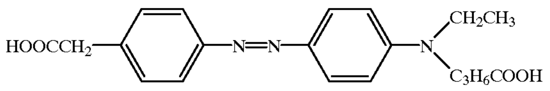

The procedure as described above for Example 1 was followed except that the aniline was replaced with N-ethylaniline, the 3-chloropropan-1-ol was replaced with ethyl 4-bromobutyrate and the 2-(4-aminophenyl)ethanol was replaced with 4-aminophenylacetic acid and the product was hydrolysed with sodium hydroxide in methanol to give the title compound m.p. 147–148° C.

EXAMPLE 3

Preparation of

The procedure as described above for Example 1 was followed except that the 3-chloropropan-1-ol was replaced with 4-bromobutan-1-ol to give the title compound m.p. 109° C.

EXAMPLE 4

Prepartation of

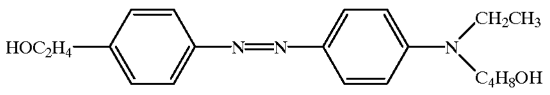

The procedure as described above for Example 2 was followed except that the ethyl 4-bromobutyrate was replaced with 4-bromobutan-1-ol to give the title compound m.p. 105–107° C.

EXAMPLE 5

Preparation of

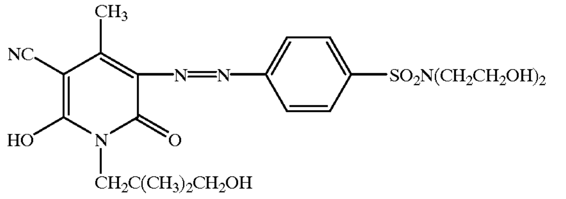

i) Synthesis of 3-cyano-1-(3-hydroxy-2,2-dimethylpropyl)-6-hydroxy4-methylpyrid-2-one Ethyl acetoacetate (13 g) and ethyl cyanoacetate (11.3 g) were added sequentially to a mixture of neo-pentanolamine (25.7 g) and water ($5cm^3$) keeping the temperature <10° C. The mixture was then refluxed for 16 hrs before drowning into water ($50cm^3$). The aqueous solution was acidified with hydrochloric acid. The pinkish coloured solid which precipitated on sting for several hours was isolated by filtration, washed with water and dried under reduced pressure. Yield—13.1 g ii) 4-Amino-N,N-bis-(2-hydroxyethyl) benzenesulphonamide (2.6 g) was stirred in water ($20cm^3$) and hydrochloric acid ($3cm^3$) added. After cooling to <10° C. a solution of sodium nitrite (0.8 g) in the minimum of water was added keepnig the temperature <10° C. After stirring for 0.25 hr excess nitrous acid was destroyed by the addition of sulphamic acid. The resulting diazonium salt solution was added dropwise to a suspension of 3-cyano-6hydroxy-4-methyl-1,3-hydroxy-2,2-dimethylpropylpyrid-2-one (2.4 g) in methanol ($50cm^3$). After stirring for 0.5 hr the yellow product was isolated by filtration, washed and recrystallised from ethanol to give 4 g (80%) of pure product having melting point 268–270° C. ($\lambda_{max}$ ($CH_2CH_2$)=432 nm).

EXAMPLE 6

Preparation of

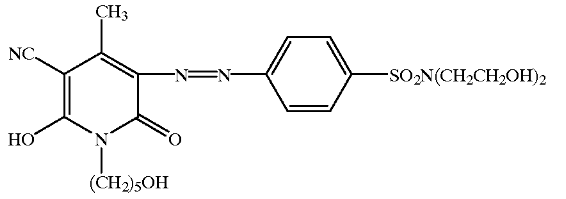

i) Synthesis of 3-cyano-6-hydroxy4methyl-1-(5-hydroxypentyl)pyrid-2-one i) The title compound was synthesised in analogous manner to Example 4i) using 5-aminopentanol in place of the neopentanolamine.

ii) The compound was synthesised in analogous manner to Example 5ii) using 3-cyano-6-hydroxy-4-methyl-1-(5-hydroxypentyl)pyrid-2-one as coupling component

EXAMPLE 7

Preparation of

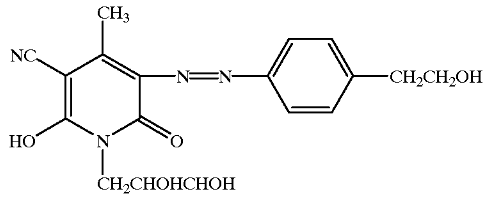

i) Synthesis of 3-cyano-1-(2,3-dihydroxypropyl)-6-hydroxy-4-methylpyrid-2-one

The title compound was prepared in analogous manner to Example 4i) using 3-aminopropane-1,2-diol (22.75 g) in place of neo-pentanolamine.

ii) 2-(4-Aminophenyl)ethanol (2.74 g) was dissolved in a mixture of water ($40cm^3$) and hydrochloric acid ($6cm^3$). After cooling to <10° C. a solution of sodium nitrite (1.6 g) in water ($5cm^3$) was added with stirring keeping the temperature <10° C. After stirring for 0.25 hr the excess nitrous acid was destroyed with sulphamic acid and the resulting diazonium salt solution added slowly to a solution of 3-cyano-1-(2,3-dhdoxpropyl)-6-hydroxy-4-methylpyrid-2-one (4.5 g) in methanol ($100cm^3$). The product was isolated by filtration, washed with methanol and dried under reduced pressure. mp 182–4° C.

EXAMPLE 8

Preparation of

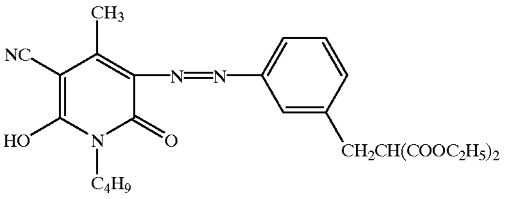

i) Synthesis of diethyl-(3- aminobenzyl)malonate

Diethyl 3-nitrobenzylidene malonate (75 g), obtained from the reaction of 3-nitrobenzaldehyde with diethyl malonate, was suspended in ethanol ($750cm^3$) and reduced with hydrogen in the presence of palladium catalyst until no further hydrogen uptake was observed. After filtering the solvent was evaporated under reduced pressure to give the pure product as a brown oil.

ii) The product from i) above (5.3 g) was diazotised as described in Example 7 and then filtered before adding slowly to a solution of 1-n-butyl-3cyano-6-hydroxypyrd-2-one (4.12 g) in methanol ($100cm^3$). After stirring for 1 hr water ($100cm^3$) was added and the product isolated by filtration and washed with water and finally methanol before air drying to give the title compound in 54% yield.

EXAMPLE 9

Preparation of

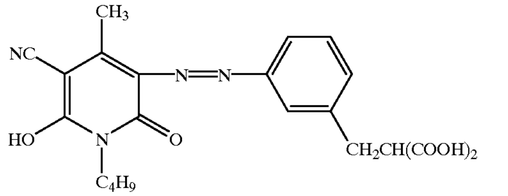

The product from Example 8 (2.4 g) was dissolved in warm methanol (25cm$^3$) and aqueous sodium hydroxide (40% w/w, 1.5cm$^3$) added dropwise. The resulting paste was poured into water (100cm$^3$), cooled to room temperature and the dark solution acidified with hydrochloric acid giving a yellow precipitate which was filtered off and washed with water before air drying. Traces of impurities were removed by slurrying in hot ethyl acetate. On filtering and washing with ethyl acetate a pure product was obtained (94%) mp 189–92° C.

EXAMPLE 10

Preparation of

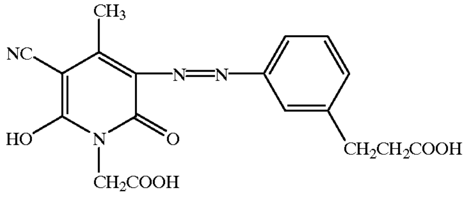

i) 3-(3-Aminophenyl)propionic acid

3-Nitrocinnamic acid (50 g) was suspended in ethanol (600cm$^3$) and reduced in the presence of palladium catalyst until no further hydrogen uptake was observed. After filtering the solvent was evaporated under reduced pressure to give the pure product in quantitative yield as a brown oil which slowly crystallised.

ii) 3-(3-Aminophenyl)propionic acid (0.83 g) was added to a solution of hydrochloric acid (3cm$^3$) in water (20cm$^3$) at 0° C. A solution of sodium nitrite (0.35 g) in the minimum of water was then added dropwise keeping the temperature below 5° C. After stirring for 0.25 hrs the excess nitrous acid was destroyed with sulphamic acid and the diazonium salt solution filtered before adding slowly to a cooled solution of 1 -carboxyrnethyl-3-cyano-6-hydroxy-4-methylpyrid-2-one (1.04 g) in methanol (50cm$^3$). After stirring for 1 hr the yellow product was filtered off washed with water and methanol and dried (81%). mp258–60° C., λmax($CH_2CH_2$) 434 nm.

EXAMPLE 11

Preparation of

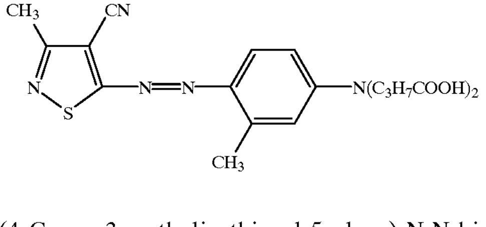

4-(4-Cyano-3-methylisothiazol-5-ylazo)-N,N-bis-(3-ethoxycarbonylpropyl)-3-toluidine (1.4 g), methanol (30cm$^3$) and sodium hydroxide liquor (0.5cm$^3$, 40% w/w) were stired and heated to reflux for 1 hr when TLC showed complete hydrolysis. The cooled mixture was poured into water (150cm$^3$) and the solution acidified with hydrochloric acid. The precipitated product was isolated by filtration, washed with water and dried to give 0.96 g of product mp 166–9° C. λmax (acetone) 548 nm.

EXAMPLE 12

Preparation of

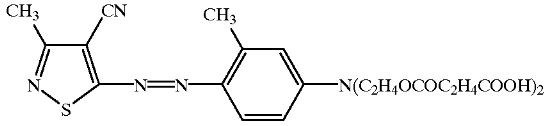

4-(4-Cyano-3-methylisothiazol-5-ylazo)-N,N-bis-(2-hydroxyethyl)-3toluidine (3.45 g) and succinic anhydride (4.4 g) were refluxed in pyridine (20cm$^3$) until TLC showed complete reaction. The cooled solution was poured into water (200cm$^3$ and acidified with hydrochloric acid. The precipitated product was filtered off, washed with water and dried under reduced pressure to give analytically pure product (90%).

EXAMPLE 13

Preparation of

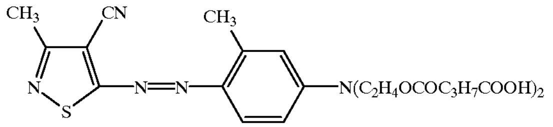

This product was synthesised in analogous manner to Example 12 replacing succinic anhydride by glutaric anhydride (5 g) to give 82% of pure product.

EXAMPLE 14

Preparation of

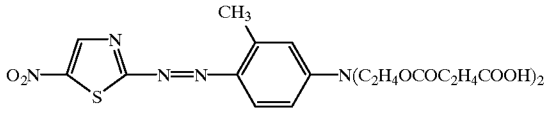

This product was synthesised in analogous manner to Example 12 replacing the 4-(4-Cyano-3-methylisothiazol-5-ylazo)-N,N-bis-(2-hydroxyethyl)-3-toluidine by 4-(5-nitrothiazol-5-ylazo)-N-N-bis-(2-hydroxyethyl)-3-toluidine (3.38 g).

EXAMPLE 15

Preparation of

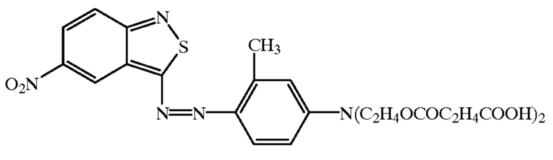

This product was synthesised in analogous manner to Example 12 replacing the 4-(4-cyano-3-methylisothiazol-5-ylazo)-N,N-bis-(2-hydroxyethyl)-3-toluidine by N,N-bis-(2-hydroxyethyl)- 4-(5-nitrobenzoisothiazol-7-ylazo)-3-toluidine (4.05 g).

EXAMPLE 16

Preparation of

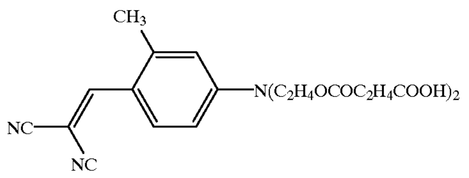

To a solution of N,N-Bis-(2-hydroxyethyl)-4-formyl-3-toluidine (3.85 g) and malononitrile (1.14 g) in ethanol ($20cm^3$) was added a few drops of piperidine. The solution was refluxed for 0.5 hr, cooled and poured into water ($150cm^3$). The resulting product was filtered off washed and dried. Reaction with succinic anhydride as described in Example 12 yielded a yellow solid (86%)

EXAMPLE 17

Preparation of

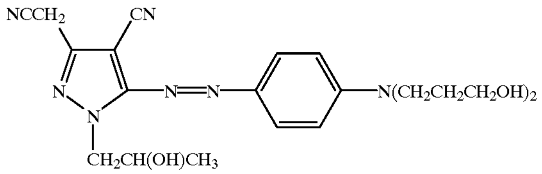

i) aniline (18.6 g), 3-chloropropan-1-ol (56.7 g) and calcium carbonate (30 g) in water ($250cm^3$) were refluxed for 30 hrs. The resulting mixture was filtered and the filtrate was separated into an oil layer and water layer. The oil was dissolved in dichloromethane and the solvent was removed to leave N,N-bis-(3-hydroxypropyl) aniline as a brown oil ii) 5-amino-4-cyano-3-cyanomethylpyrazole (14.7 g) was added portionwise with stirring to a mixture of hydrochloric acid ($48cm^3$) and acetic acid ($320cm^3$) at 0–5° C., and sodium nitrite (8.28 g) in water ($32cm^3$) was added dropwise. The mixture was stirred for 1 hr and the excess nitrous acid was destroyed by the addition of sulphamic acid. The resulting solution was added with stirring to a solution of N,N-bis (3-hydroxypropyl) aniline ($20.6cm^3$) in methanol ($400cm^3$) at 0–5° C. stirred for 1 hr, diluted with water (500cm3) and sodium acetate was added to adjust the pH to 4. The resulting solution was extracted with ethyl acetate ($3\times300cm^3$) and the combined extracts were dried over magnesium sulphate, filtered and evaporated to leave N,N-bis(3-hydroxypropyl)-amino4-(4-cyano-3-cyanomethylpyrazol-5-ylazo) aniline as an orange solid iii) Chloroacetone (2.3 g) was added dropwise with stirring to a mixture of tetrabutylammonium iodide (0.4 g), N,N-(3-hydroxypropyl)-amino-4-(4-cyano-3-cyanomethylpyrazol-5-ylazo)aniline (8.5 g), potassium hydroxide (1.29 g) and water ($20cm^3$) in acetone ($120cm^3$). The mixture was stirred for 15 hrs, diluted with water (300cm) to leave the product as a magenta solid. The product was added to methanol ($20cm^3$) and stirred vigorously while an excess of sodium borohydride (0.77 g) was added. The mixture was stirred for 2hrs, acetone ($10cm^3$) added followed by slow addition of water ($500cm^3$) to leave the title compound as a red solid m.p 104° C. λmax 500 nm εmax 36692.

EXAMPLE 18

Preparation of

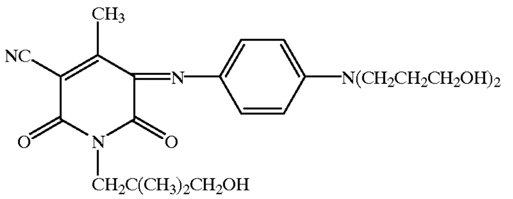

i) Aniline (37.2 g), 3-chloropropan-1-ol (113.4 g), and calcium carbonate (60 g) in water ($500cm^3$) were refluxed for 30 hrs. The resulting mixture was filtered and the filtrate separated into an oil and a water layer. the oil was dissolved in dichloromethane and the solvent removed to leave N,N-bis(3-hydroxypropyl)aniline as a brown oil.

ii) N,N-bis(3-hydroxypropyl) aniline (10.46 g) was dissolved in hydrochloric acid ($20cm^3$) at 0–5° C. and sodium nitrite (3.45 g) in water($15cm^3$) was added dropwise. The mixture was stirred for 1 hr, water ($10cm^3$) was added, made alkaline with sodium carbonate, separated in to an oil and water layer. The oil was dissolved in dichloromethane and the solvent removed to leave N,N-bis(3-hydroxypropyl)4-nitrosoaniline as a yellow solid.

iii) Iron powder (6.72 g), N,N-bis(3-hydroxypropyl)-4-nitrosoaniline (10 g) and hydrochloric acid($20cm^3$) in methanol ($120cm^3$) were refluxed for 2hrs. The resulting mixture was made alkaline with sodium carbonate, filtered and the solvent removed to leave N,N-bis(3-hydroxypropyl)-4-aminoaniline as a brown solid.

iv) Ammonium persulphate (9.13 g) was added portionwise with stirring to a mixture of N,N-bis(3hydroxypropyl)-4-aminoaniline(4.48 g), 3-cyano-6-hydroxy-4-methyl-1-neopentylpyrid-2-one (4.73 g), sodium carbonate (4.24 g) and acetone ($30cm^3$) in water (cm), stirred for 1 hr, acetone removed and the resulting solution was extracted with ethyl acetate ($3\times200$ $cm^3$) and the combined extracts dried over magnesium sulphate, filtered and solvent removed to leave the title compound. m.p. 166° C., λmax 569 nm (methanol). εmax 25370.

EXAMPLE 19

Preparation of

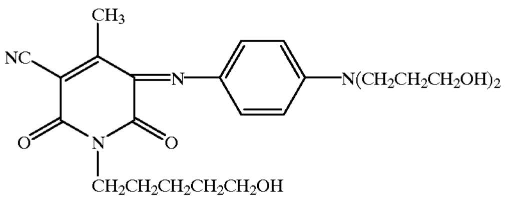

The procedure as described in Example 18 above was followed, except that the 3-cyano-6-hydroxy-4-methyl-neopentylpyrid-2-one was replaced by 3-cyano-6-hydroxy-1-(5-hydroxypentyl)-4-methyl-pyrid-2-one(4.7 g) to give the title compound m.p.161–162° C., λmax 590 nm εmax 28717.

EXAMPLE 20

Preparation of

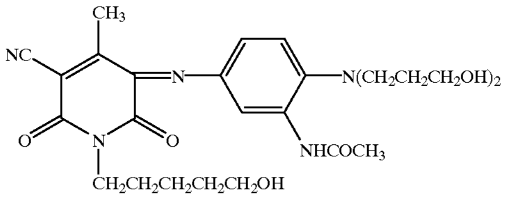

The procedure as described in Example 19 above was followed, except that the aniline was replaced with 2-aminoacetanilide (42.23 g) to leave the title compound m.p. 230–232° C., λmax 644 nm, εmax 38299

EXAMPLE 21

Preparation of

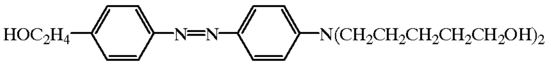

The procedure as described for Example 1 was followed except that the 3-chloropropan-1-ol was replaced with 5-chloropentan-1-ol to give the title compound m.p.68–70° C., λmax 416 nm (ethyl acetate), εmax 31354

EXAMPLE 22

Preparation of 4-chlorobutyronitile, the 2-(4-aminophenyl) ethanol was replaced with aniline to give the title compound M.P 88–90° C., λmax 402 nm (dichloromethane), εmax 27900.

EXAMPLE 25

Preparation of

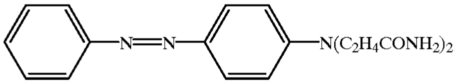

The procedure as described above for Example I was followed, except that the 3-chloropropan-1-ol was replaced with acrylamide and the 2-(4-aminophenyl)ethanol was replaced with aniline to give the title compound m.p. 171–175° C., λmax 404 nm (ethyl acetate), εmax 26932.

EXAMPLE 26

Preparation of

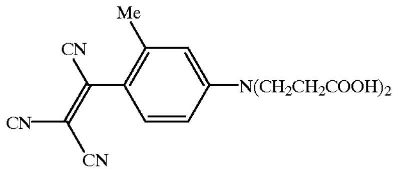

To N,N-dicarboxyethyl-3-toluidine (2.51 g, 0.01 mol) and dimethylformamide ($5cm^3$) was added tetracyanoethylene (1.28 g, 0.01mol) over 15 mins; keeping the temperature

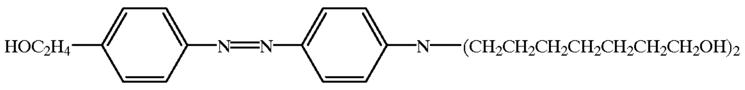

The procedure as described for Example 1 was followed except that the 3-chloropropan-1-ol was replaced by 7-bromoheptan-1-ol to give the title compound λmax 416 nm (ethyl acetate), εmax 30641.

EXAMPLE 23

Preparation of

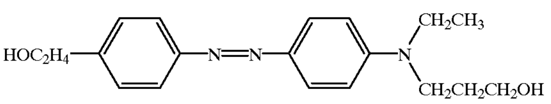

The procedure as described for Example 2 was followed except that the ethyl-4-bromobutyrate was replaced with the chloropropan-1-ol and the 2-(4-aminophenyl)acetic acid was replaced with 2-(4-aminophenyl) ethanol to give the title compound λmax 414 nm (ethyl acetate), εmax 35656.

EXAMPLE 24

Preparation of

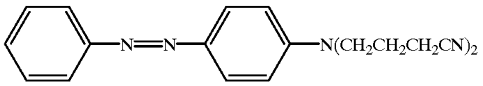

The procedure as described above for example I was followed except the 3-chloropropan-1-ol was replaced with below 40° C. Reaction mixture heated to 55° C. for ½ hr, solution cooled, poured into ice/water to give a sticky solid. Solid purified by column chromatography (silica; ethylacetate) to give a black solid (1 g, 28%). λmax (MeOH) 524 nm.

EXAMPLE 27

Preparation of

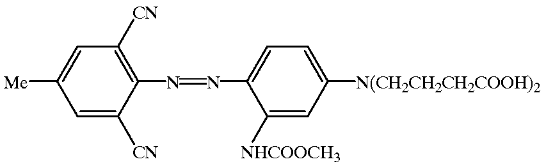

The diethylester (1.5 g, 0.003mol) was dissolved in methanol ($30cm^3$) and 48% sodium hydroxide solution ($0.5cm^3$) added, reaction stirred and refluxed for 1 hr. The mixture was poured into water ($150cm^3$) acidified with concentrated HCl and precipitated solid filtered off, washed with water and dried (1 g, 74%). λmax (MeOH) 524 nm.

EXAMPLE 28

Preparation of

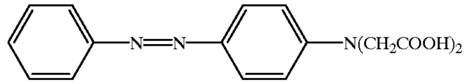

Prepared by diazotisation of aniline and coupling with N-phenyidiiminoacetic acid. λmax (MeOH) 396 nm.

EXAMPLE 29

Preparation of

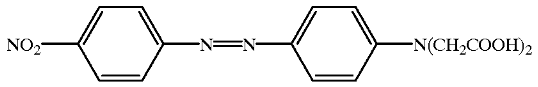

Nitrobenzenediazoniumtetrafluoroborate (2.37 g, 0.01 mol) in methanol/water ($25cm^3$) and N-phenyldiiminoacetic acid (2 g, 0.01mol) in methanol ($10cm^3$) were stirred for 1 hr to give a reddish solution. Concentration gave a red solid, which was purified by chromatography (silica; dichloromethane/methanol) to give the product as a reddish brown solid (1 g, 28%). λmax (MeOH) 434 nm.

EXAMPLE 30

Preparation of

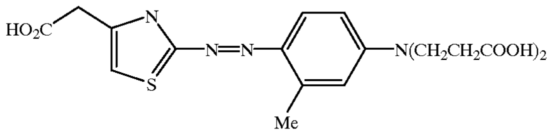

Prepared by diazotisation of 2-aminothiazole acetic acid and coupling with N,N-dicarboxyethyl-m-toluidine in 86% yield. )max (MeOH) 496 nm.

EXAMPLE 31

Preparation of

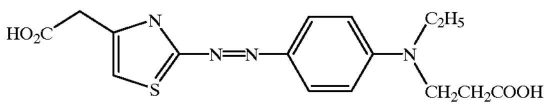

Prepared by diazotisation of 2-aminothiazole acetic acid and coupling with N-ethyl-N-carboxyethylaniline in 76% yield. λmax (MeOH) 492 nm.

EXAMPLE 32

Preparation of

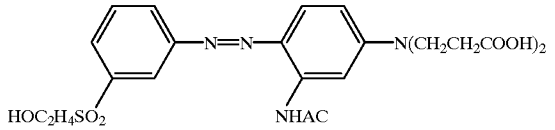

Prepared by diazotisation of m-aminophenylhydroxyethylsulphone and coupling with dicarboxyethyl-m-acetanilide in 73% yield. λmax (MeOH) 458 nm.

EXAMPLE 33

Preparation of

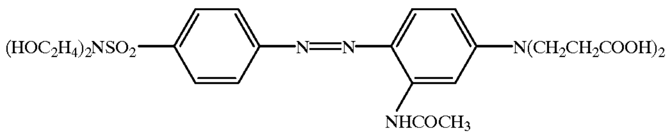

Prepared by diazotisation of p-aminophenyldihydroxethylsulphonamide and coupling with dicarboxyethyl-m-acetanilide in 77% yield. λmax (MeOH) 764 nm.

EXAMPLE 34

Preparation of

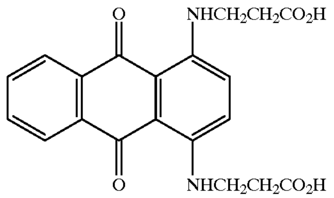

1,4-Diaminoanthraquinone (3.6 g, 0.015 mol) and acrylic acid ($30cm^3$) were stirred at 100–110° C. for 1½ hrs, allowed to cool and diluted with methanol ($45cm^3$). After cooling to room temperature, the product was filtered off, washed with methanol and dried (4.9 g, 86%). λmax (MeOH) 570 nm.

EXAMPLE 35

Preparation of

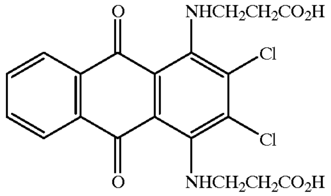

Using 2,3-dichloro-1,5-diaminoanthraquinone in the procedure described in Example 34 above gave the required product. λmax (MeOH) 636+590 nm.

EXAMPLE 36

Preparation of

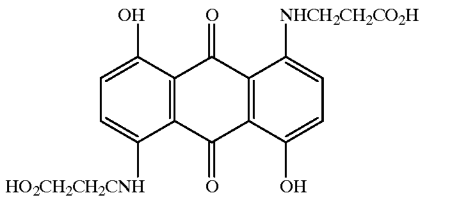

Using diaminoanthrarufin in the procedure described in Example 34 above gave the required product. λmax (MeOH) 660+610 nm.

EXAMPLE 37

Preparation of

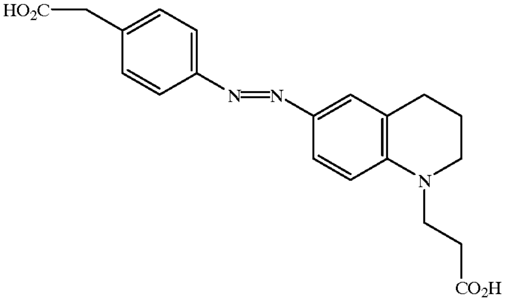

Diazotisation of 4-aminophenylacetic acid and coupling with carboxyethyltetrahydroquinoline.

EXAMPLE 38

Preparation of

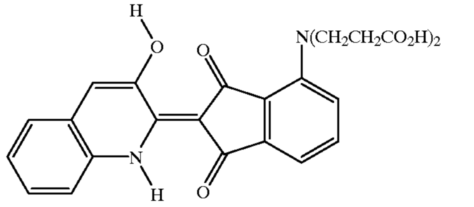

3'-Hydroxy-3-aminoquinophthalone (0.5 g) and acrylic acid ($20cm^3$) were mixed and stirred at reflux 135–140° C. for 2 hrs. Reaction cooled and drowned into water ($200cm^3$). Precipitated solid filtered, washed with water and dried (0.5 g). λmax (MeOH)

EXAMPLE 39

Preparation of

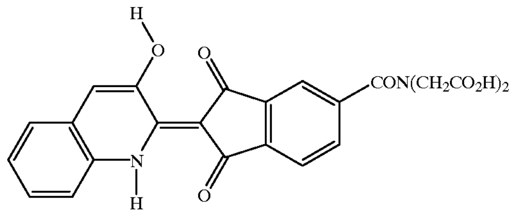

To 3'-hydroxy-5-quinophthalone carbonyl chloride (0.01 mol) in N-methylpyrrolidone ($30cm^3$) was added pyridine ($3cm^3$) and diiminoacetic acid (0.015 mol). Mixture then heated at 120° C. for 3 hrs, cooled, poured into water ($150cm^3$) and acidified with dilute hydrochloric acid. Precipitated solid filtered off and dried (3.5 g).

EXAMPLE 40

Preparation of

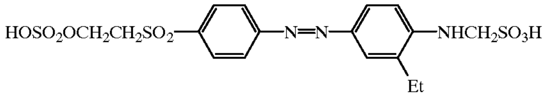

Prepared by diazotisation of p-aminophenylsulphatoethylsulphone and coupling with O-ethyl-N-sulphomethyl aniline. λmax 432 nm.

EXAMPLE 41

Preparation of

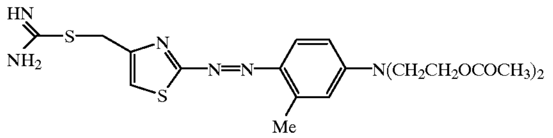

Prepared by diazotisation of 4-amidinothiomethyl-2-aminothiazole and coupling with bis-acetoxyethyl-m-toluidine. λmax 510 nm.

EXAMPLE 42

Preparation of

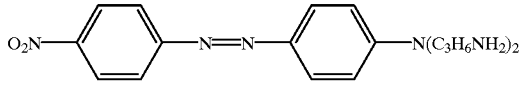

4-Nitroaniline (4.2 g) was added portionwise with stirring to a mixture of acetic acid ($200cm^3$), propionic acid ($9cm^3$) and nitrosyl sulphuric acid 40% w/w ($10cm^3$) at 0–5° C. The mixture was stirred for 1 hr. The resulting solution was added with stirring to a solution of N,N-diaminopropylaniline (6.2 g) and sulphamic acid (1 g) in methanol ($200cm^3$) at 0–5° C., stirred for 1 hr, diluted with water ($300cm^3$) to give the title compound mp 130–132° C., λmax 462 nm (acetone).

EXAMPLE 43

Preparation of

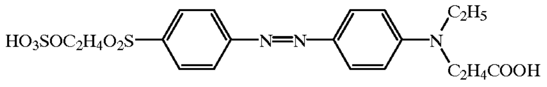

4-Aminophenyl-2-sulphatoethylsulphone (5.8 g) was added portionwise with stirring to a mixture of concentrated hydrochloric acid ($20cm^3$), in water ($180cm^3$) at 0–5° C. and sodium nitrite (1.52 g) in water ($200cm^3$) was added dropwise. The mixture was stirred for 1 hr and the excess nitrous acid destroyed by the addition of sulphamic acid. The resulting solution was added with stirring to a solution of N-ethyl-N-carboxyethylaniline (3.86 g) in methanol ($200cm^3$) at 0–5° C., stirred for I hr and sodium acetate was added to adjust the pH to 4 to give the title compound, mp 145–150° C., λmax 425 (methanol).

EXAMPLE 44

Preparation of

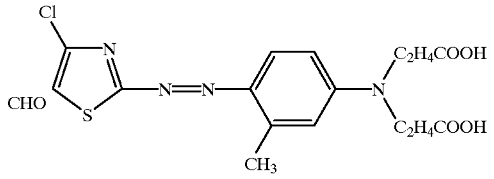

Prepared by diazotisation of 2-amino-4-chloro-5-formylthiazole and coupling with N,N-dicarboxyethyl-m-oluidine in 60% yield, λmax 536 nm (acetone).

EXAMPLE 45

Preparation of

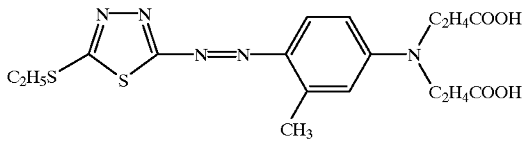

Prepared by diazotisation of 2-amino-5-(ethylthio)-1,3,4-thiadiazole and coupling with N,N-dicarboxyethyl-m-toluidine in 70% yield, λmax 504 nm (acetone).

EXAMPLE 46

Preparation of

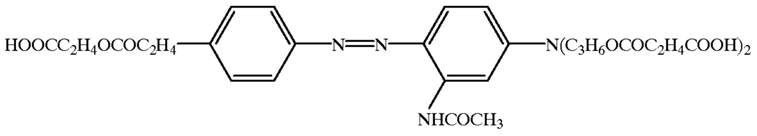

The procedure as described for Example 12 was followed except the 4-(4-cyano-3-methylisothiazol-5-ylazo)-N-N-bis(2-hydroxyethyl)-3-toluidine was replaced by 4-(4-ethylhydroxyphenylazo)-N-N-bis(2-hydroxyethyl)-3-aminoacetanilide to give the title compound, λmax 464 nm (water).

EXAMPLE 47

Preparation of

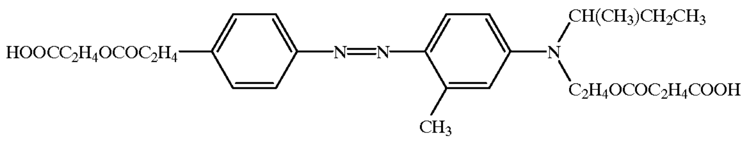

The procedure as described for Example 12 was followed except the 4-(4-cyano-3-methylisothiazol-5-ylazo)-N-N-bis(2-hydroxyethyl)-3-toluidine was replaced with 4-(4-ethylhydroxyphenylazo)-N-secbutyl-N-carboxyethyl)-3toluidine to give the title compound, mp 140–142° C., λmax 416 nm (methanol).

EXAMPLE 48

Preparation of

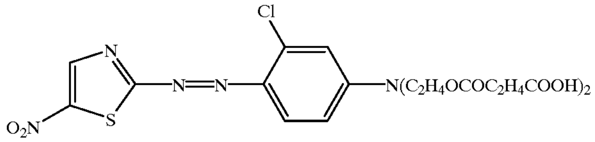

The procedure as described for Example 14 was followed except the 4-(5-nitrothiazol-5-ylazo)-N-N-bis(2-hydroxyethyl)-3-toluidine was replaced with 4-(5-nitrothiazol)-N-N-bis(2-hydroxyethyl)-3-chloro-aniline to give the title compound, λmax 532 nm (methanol).

EXAMPLE 49

Preparation of

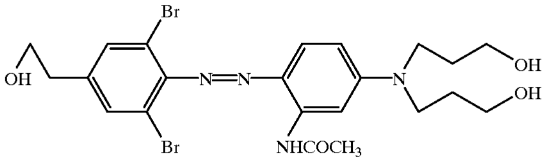

2-(4-Amino-3,5-dibromophenyl) ethanol (5.9 g, 0.02 mole) was dissolved in acetic acid ($75cm^3$) and concentrated hydrochloric acid ($3cm^3$) added. The resulting suspension was cooled to 5° C. and a solution of sodium nitrate (1.38 g, 0.02 mole) in the minimum of water added keeping the temperature <8° C. After stirring for 15 mins a positive response to sulphone indicator was achieved and the excess nitrous acid destroyed with sulphonic acid. The diazonium salt solution was then added to a cooled solution of 3-(N,N-bis-3-hydroxypropylamino)acetanilide (5.32 g, 0.02 mole) in methanol ($100cm^3$) to which sodium acetate (5.7 g) was diluted with water ($250cm^3$) and the orange product filtered off washed well with water and dried in a vacuum oven at 60° C. Yield 8.29 g (72.4%).

EXAMPLE 50

Preparation of

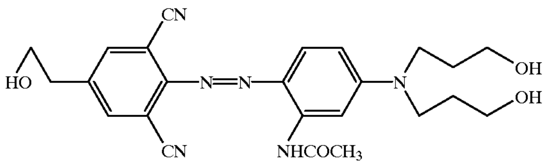

The dibromo compound from Example 49 (5.72 g, 0.01 mole), cuprous cyanide (1 .79 g, 0.02 mole) and DMF ($50cm^3$) were stirred and heated to 85° C. for 1½ hrs. The cooled solution was poured into water ($250cm^3$) and the precipitated product filtered off and washed with water before pulling as drying as possible on the filter. The sticky solid was then extracted with 74 OP ethanol in a soxhlet apparatus. The crude solid obtained by evaporation of the solvent was absorbed onto silica gel and purified by column chromatography eluting with ethyl acetate/methane (80/20). All clean fractions were combined and evaporated to dryness at the rotovapor to give the title compound (1.05 g, 22.6%). λ=532 nm, ε=41,227.

EXAMPLE 51

Preparation of

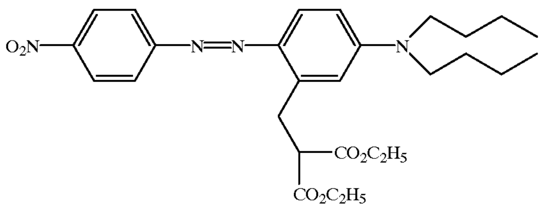

i) Diethyl(3-aminobenzyl)malonate (13.27 g, 0.05 mole) n-butyl bromide (27.4 g, 0.2 mole), calcium carbonate (7.5 g, 0.075 mole) and water ($50cm^3$) were stirred and heated to 100° C. overnight. Analysis by gas chromatography the following day showed no starting material. The solution was filtered from the inorganics and the product extracted into dichloromethane ($1\times100cm^3$, $1\times50cm^3$). The organic phases were combined, dried over magnesium sulphate, filtered and the solvent evaporated at the rotovapor to give diethyl(3-N,N-di-n-butylaminobenzyl)malonate (19.13 g).

ii) p-Nitrobenzenediazonium fluoroborate (1.1 8 g, 4.98 mole) was dissolved in a water-acetone mixture and filtered into a solution of diethyl (3-N,N-di-n-butylaminobenzyl) malonate (1.85 g, 4.9 mole) in methanol ($30cm^3$). After stirring for a further 30mins the mixture was diluted with water (100 $cm^3$) and allowed to stand over the weekend. The sticky solid was filtered off and washed with water. Sample was purified by column chromotography on silica gel to give the title compound (1.82 g, 69.4%).

EXAMPLE 52

Preparation of

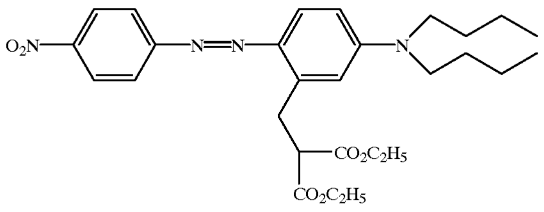

The azo diester from Example 51 (1.5 g) was dissolved in methanol ($30cm^3$) the aid of gentle warming and caustic liquor (ca 48% w/w 10 drops) added with stirring. After 15 mins TLC showed no azo diester remaining. The solution was poured onto ice (150 g) and the slurry obtained was acidified by the addition of hydrochloric acid. The resulting dark red solid was filtered off and washed well with water before air drying. The solid was purified by column chromatography on silica gel using 8% v/v methanol in dichloromethane to give the title compound (0.29 g).

EXAMPLE 53

Preparation of

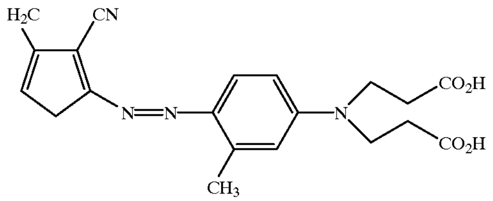

i) A mixture of acetic acid ($150cm^3$), propionic acid ($25cm^3$) and nitrosyl sulphuric acid ($36cm^3$, 40% w/v) was stirred and cooled to 0–5° C. 5-Amino-4-cyano-3-methylisothiazole (13.9 g, 0.1 mole) was then added portionwise over 30mins. The mixture was stirred at 0–5° C. for 4 hrs giving homogeneous yellow solution. The excess nitrosyl sulphuric was destroyed by the addition of sulphamic acid and the solution divided into two equal portions ie 0.05 mole each one of which was used in ii) below.

ii) N,N-bis-(2-carboxyethyl)-m-toluidene (12.3 g, 0.05 mole) was dissolved in methanol ($500cm^3$) and sodium acetate (25 g) added. The mixture was cooled in an ice bath and the diazonium salt solution from i) above (0.05 mole) added dropwise over 30mins. After stirring for a further hour the mixture was diluted with water (11) and the product filtered off, washed well with water and recrystallised from aqueous acetone before drying in a vacuum um at 60° C. to give the title compound (13.5 g, 67.26%).

What is claimed is:

1. An ink composition comprising:

(a) a solvent based medium or a medium comprising (i) or (ii);

(i) a mixture of water and a water-soluble organic solvent; or (ii) a low melting point solid; and (b) a compound of the Formula (1) and salts thereof:

Formula (1)

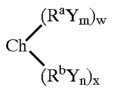

wherein $R^a$ and $R^b$ each independently is $C_{2-10}$-alkylene or an atom or group comprising at least one atom selected from Si and S;

Y is an interactive functional group such that the Y groups on different molecules may interact with each other to form complexes of larger size and thus of lower mobility and/or with a substrate, wherein each Y independently is selected from OH, $NH_2$, $NHR^{24}$, COOH, $CONH_2$, $CONHR^{24}$, $SO_2NHR^{24}$, $NHCONH_2$, $NHCONHR^{24}$, =NOH, $OR^{24}$, —NHC(=NH)$NH_2$, —SC(=NH)$NH_2$ and mono chloro-S-tiazinyl;

$R^{24}$ is alkyl, aryl or arlkyl;

w and x each independently is 0 or an integer equal to or greater than 1; and m and n each independently is an integer equal to or gamer than 1, provided that w and x are not both equal to zero and when one of w or x is 0 at least one of m and n is equal to or greater than 2;

Ch is selected from the group consisting of an optionally substituted group of the Formula (2), (2B) and tautomers thereof, (3), (4) or (5):

Formula (2)

Formula (2B)

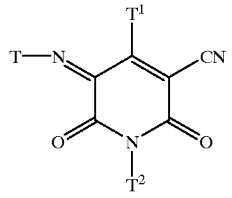

Formula (3)

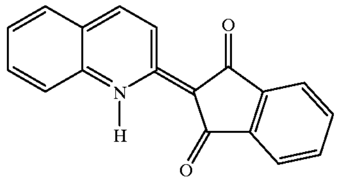

Formula (4)

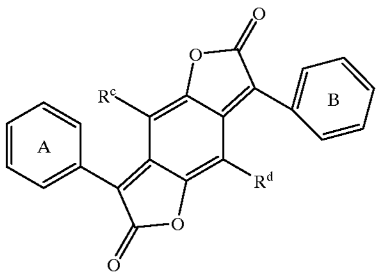

Formula (5)

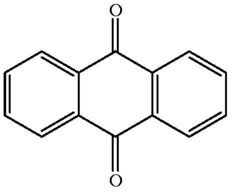

except for 1,4-bis(4-a-rinobutyl)-9,10-anthracenedione and 1,4-bis(3-amninopropyl)-9,10-anthracenedione;

$R^1$ and $R^2$ each independently is —H, or optionally substituted alkyl or alkoxy;

T is $A^1$-NH or optionally substituted phenyl;

$T^1$ is optionally substituted $C_{1-12}$-alkyl or optionally substituted aryl;

$T^2$ is optionally substituted alkyl;

X is —C(R) or N;

R is H, CN or COOalkyl;

$R^c$ and $R^d$ each independently is H, alkyl, alkoxy or halogen and Ring A and Ring B may carry from 1 to 5 optional substituents;

A is $A^1$-N in which $A^1$ is the residue of a diazositiable aromatic or beteroaromatic amine or; selected from an optionally substituted group of Formula (6), (7), (8), (9), (10) or (11);

Formula (6)

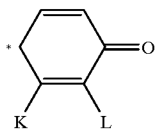

Formula (7)

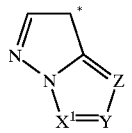

Formula (8)

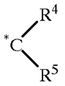

Formula (9)

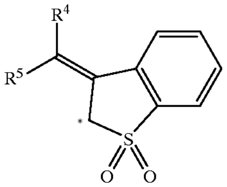

Formula (10)

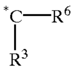

Formula (11)

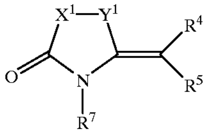

K and L each independently is any of the optional substituents listed below, or K and L together with the carbon atoms to which they are attached form a 5- or 6-membered carboncyclic or heterocyclic ring;

$X^1$, Y and Z each independently is N or C-$R^3$ in which $R^3$ is —H, —CN alkyl, alkoxy, cycloalkyl, aryl, aralkyl, aryloxy or amino;

$R^4$ and $R^5$ each independently is an electron withdrawing group or $R^4$ and $R^5$ may be joined from a heterocyclic ring;

$R^6$ is alkenyl or

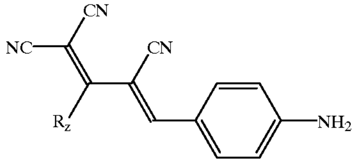

$R_2$ is $NH_2$, phenyl or succinamido;

$X^2$ and $Y^2$ are both c;

$R^7$ is —H, alkyl or aryl;

* shows the point of attachment to the double bond in Formula (2); and when Ch is optionally substituted the optional substituents are selected from CN, —$NO_2$, Cl, —F, —Br, $C_{1-6}$-alkyl, $C_{1-6}$-alkoxy, —$NHCOC_{1-6}$-alkyl, NHCOphenyl, —$NHSO_2$phenyl and phenoxy.

2. A process for printing a substrate with an ink composition using an ink jet printer, characterised in that the ink composition comprises at least one compound of Formula (1) according to claim 1.

3. A paper or an overhead projector slide or textile material printed with an ink composition comprising a compound of Formula (1) according to claim 1.

4. A process for the coloration of a textile material with an ink composition comprising a compound of Formula (1) according to claim 1 which comprises the steps:

i) applying to the textile material by inkjet printing the ink composition; and ii) heating the textile material at a temperature from 50° C. to 250° C. to fix the compound on the material.

5. A textile material, coloured with an ink composition according to claim 1.

6. An ink according to claim 1 wherein $R^a$ and $R^b$ are $C_{3-10}$-alkylene.

7. An ink according to claim 1 wherein:

Ch is an optionally substituted group of the Formula (2);

X is N;

A is $A^1$-N;

$A^1$ is as defined in claim 1; and the optional substituents on Ch are selected from —CN, —$NO_2$, —Cl, —F, —Br, $C_{1-6}$-alkyl and $C_{1-6}$-alkoxy.

8. An ink according to claim 1 wherein:

Ch is an optionally substituted group of the Formula (5);

one of $R^a$ and $R^b$ is $C_{2-10}$-alkylene; and the optional substituents on Ch are selected from —CN, —$NO_2$, —Cl, —F, —Br, $C_{1-6}$-alkyl and $C_{1-6}$-alkoxy.

9. An ink according to claim 1 wherein Ch contains a substituted group comprising an α-branched N-alkyl group.

10. An ink according to claim 1 wherein the medium comprises a mixture of water and water-soluble organic solvent in a weight ratio of water to water-soluble organic solvent of from 99:1 to 1:99.

* * * * *